United States Patent [19]

Matthews

[11] 3,961,593

[45] June 8, 1976

[54] DOCK FENDER ASSEMBLY

[76] Inventor: Joseph E. Matthews, 4017 N. Witchduck, Virginia Beach, Va. 23455

[22] Filed: May 30, 1975

[21] Appl. No.: 582,138

[52] U.S. Cl. ................................. 114/219; 61/48
[51] Int. Cl.² ................................ B63B 59/02
[58] Field of Search ............... 114/219; 61/48; 293/71 R; 267/39, 139, 140

[56] References Cited
UNITED STATES PATENTS

| | | | |
|---|---|---|---|
| 3,096,973 | 7/1963 | Bergen | 114/219 |
| 3,114,244 | 12/1963 | Silver | 61/48 |
| 3,418,815 | 12/1968 | Kumazawa | 114/219 |
| 3,820,495 | 6/1974 | Ueda | 114/219 |

FOREIGN PATENTS OR APPLICATIONS

| | | | |
|---|---|---|---|
| 374,088 | 6/1932 | United Kingdom | 114/219 |

Primary Examiner—Trygve M. Blix
Assistant Examiner—Stuart M. Goldstein
Attorney, Agent, or Firm—Robert G. McMorrow

[57] ABSTRACT

A dock fender for application to an impact deck with a top and a side has an upper wall attached to the top and a fender portion. An internal lip and a base contact the side, and the fender defines a flexation chamber.

1 Claim, 2 Drawing Figures

DOCK FENDER ASSEMBLY

BACKGROUND OF THE INVENTION

1. Field of the Invention

This invention relates to means for protection of fixed piers or docks, and for watercraft using such piers or docks.

2. Statement of the Prior Art

Pier protection devices with air pockets or chambers therein have been previously proposed. Representative of U.S. patents in this area of interest are the following:

| Patent No. | Patentee | Issued |
|---|---|---|
| 3,494,607 | Rusch | Feb. 10, 1970 |
| 3,574,406 | Wessells, III | Apr. 13, 1971 |
| 3,096,973 | Bergen | July 9, 1963 |
| 2,910,033 | Weisburg | Oct. 27, 1959 |
| 3,418,815 | Kumazawa | Dec. 31, 1968 |
| 3,449,917 | Roskopf | July 17, 1969 |

SUMMARY OF THE INVENTION

The present invention relates to a flexible fender for protection of watercraft, piers and docks. The device is applicable to existing dock facilities of either the floating or fixed variety. The unit is applied to the dock to extend longitudinally the full length thereof.

The fender includes a flexation chamber which serves as an air cushion.

The fender is so formed that it includes a rounded main fender portion thereof preventing damage to craft having bow flares and the like as tides rise and fall.

The fender is economical to fabricate and install and effective in use.

The flexation chamber is of a particular configuration suited to avoidance of damage despite the angle of attack of an impact thereagainst.

Other and further objects and advantages of the invention will become apparent to those skilled in the art from a consideration of the following specification when read in conjunction with the annexed drawing.

DESCRIPTION OF THE PREFERRED EMBODIMENT

Figure 1:
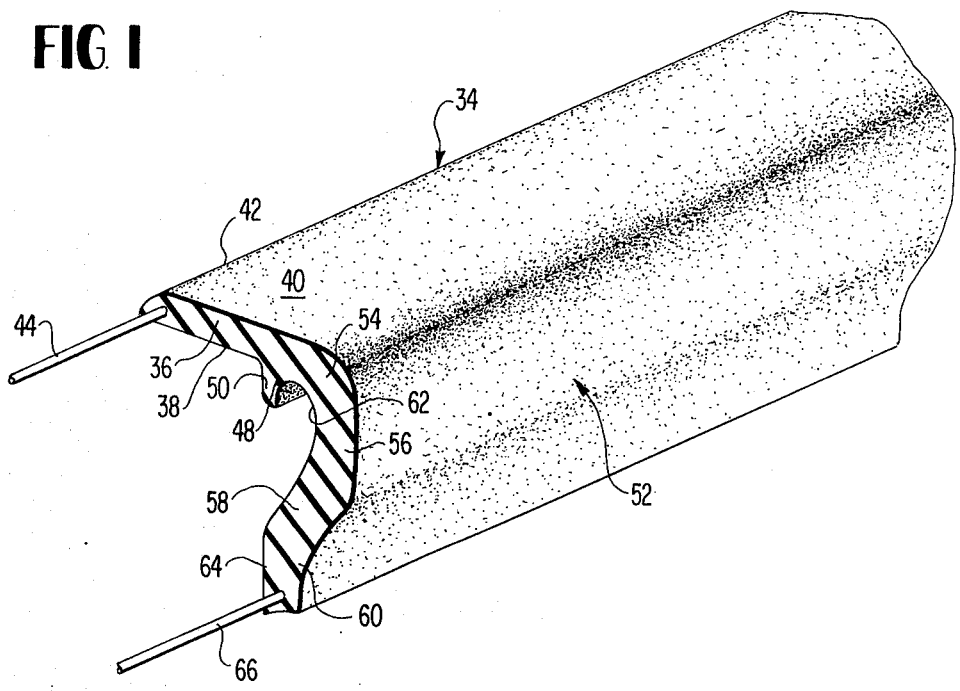
FIG. 1 is a perspective view partially broken away and in section of a dock fender constructed and assembled in accordance with the teachings of this invention.
Figure 2:
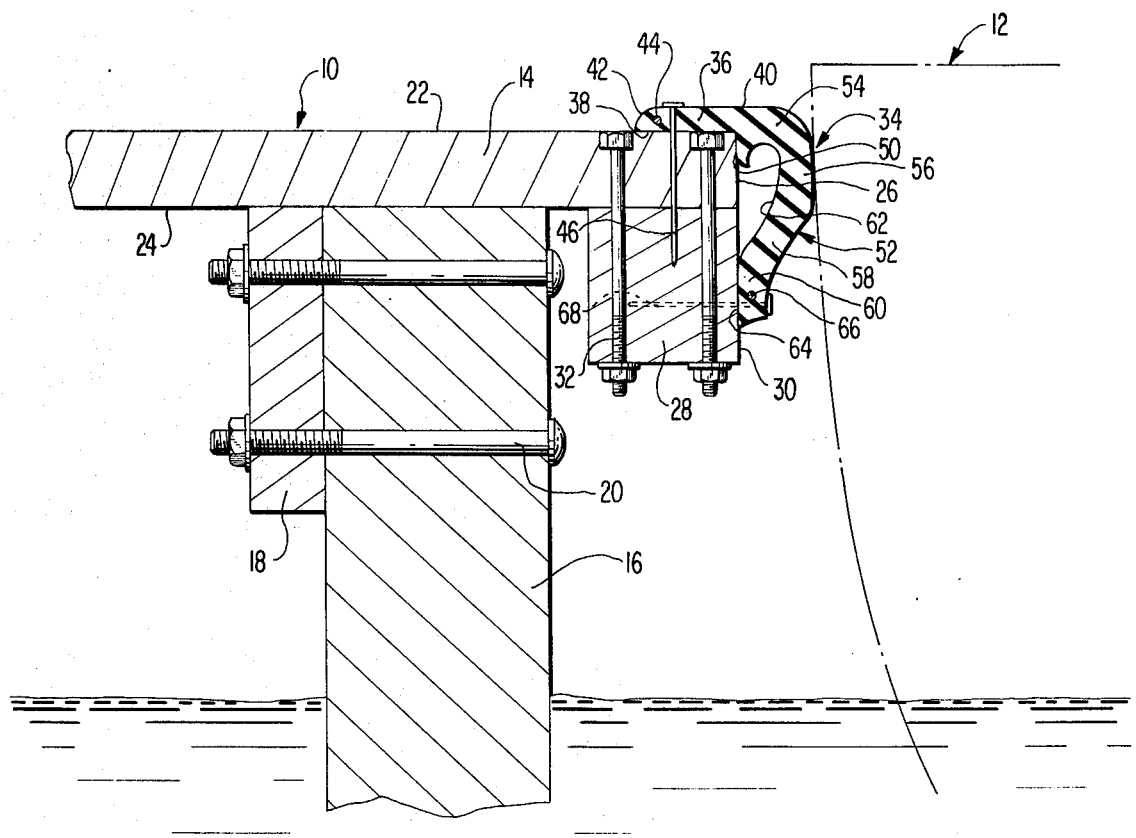
FIG. 2 is a vertical cross section on reduced scale of a typical installation of the dock fender.

The environment of intended utilization of this invention is that of a longitudinal surface having a projecting edge subject to impact. Typically, as shown in FIG. 2 of the drawing, this involves a pier or dock 10 to which a watercraft 12 may be moored. The dock includes a deck 14 which overhangs its support piling 16 and is connected to a longitudinal stringer 18. Cross bolt assemblies 20 extend through the piling and stringer in conventional fashion. The deck 14 has a top 22, a bottom 24, and a side edge 26.

In many instances of employment of the fender hereof, it is necessary or desirable to add depth dimension to the deck edge. This is accomplished through the application of an elongated strip 28. The strip 28 has an outer side face 30 which is aligned with the side edge 26 of the deck, and connection is effected through bolt/nut assemblies 32 which extend through the deck and the strip.

The dock fender hereof is generally identified in the drawing by reference character 34. The fender 34 is formed of rubber or other flexible, resilient material, and is of unitary construction. A horizontal upper wall 36 of the fender has inner and outer surfaces 38 and 40, and is mounted on the deck 14 with the inner surface 38 in flush contact with the deck top 22.

The inner edge 42 of the upper wall 36 is rounded to prevent the occurrence of a sharp edge. Embedded in the wall during fabrication and extending longitudinally throughout the full length of the wall adjacent the edge 42 is a rigidifying rod 44 of metal or the like. Fastening means such as a series of spikes or nails 46 extend through the upper wall and into the deck and the strip 28. The fastening means is located outboard of the rigidifying rod to insure the integrity of the mount.

Depending from the inner surface 38 of the wall, and delineating the inward extent thereof, is a vertical lip 48. The lip 48 has a straight inside surface 50 which bears directly against the side edge 26 of the deck.

The fender assembly further comprises a main fender portion 52. This includes an outwardly angled arm 54, a generally vertical bumper 56, an inwardly angled leg 58, and a connector base 60.

As will be observed in the drawing, the main fender portion 52 and the lip 48 define an open chamber 62. The chamber permits a substantial degree of flexation of the main fender portion in such manner as to provide a maximum degree of impact protection to craft which encounter the deck, regardless of the angle of attack of the craft when encountering the dock. As shown, the chamber 62 extends from a position behind the lip, whereat it is substantially semi-circular in configuration, to the connector base, being of decreasing depth as it approaches the base. This shape affords particularly good protection to flared hull vessels, and the like.

The connector base 60 has a substantially flat interior surface 64 which is secured to the outer side face 30 of the strip 28. A second rigidifying rod 66 is embedded in the base, and extends longitudinally therethrough, and a series of nails 68 form the connecting means therefor. It will be observed in the drawing that the nails are extended a substantial distance into the strip.

I claim:

1. The combination, with a dock having an overhanging deck, said deck including a top, a bottom, and a side edge, of a dock fender assembly, comprising:
   an elongated strip, having an outer side face, affixed to the bottom of the deck with said outer side face vertically aligned with the side edge of the deck;
   a dock fender formed of resilient material;
   the dock fender including a horizontal upper wall with inner and outer surfaces secured to the deck and with the inner surface contacting the top of the deck;
   a rigidifying rod embedded in the upper wall and extending longitudinally therethrough;
   means extending through the horizontal upper wall outboard of the rigidifying rod and into the deck;
   the dock fender including a vertical lip outward of the upper wall, said lip bearing against the side edge of the dock;
   the dock fender further including a main fender portion having an outwardly extending arm, a vertical bumper, an inwardly angled leg, and a connector base;

the main fender portion and the lip defining an open chamber which permits flexation of the main fender portion, said chamber extending from a position behind the lip whereat it is semi-circular to the connector base and is of decreased depth as it approaches the base;

a rigidifying rod embedded in the connector base and extending longitudinally therethrough; and means extending through the connector base below the rod into said elongated strip to affix the base to the strip.

\* \* \* \* \*